(12) United States Patent
Knoop

(10) Patent No.: US 11,560,929 B2
(45) Date of Patent: Jan. 24, 2023

(54) GUIDE ASSEMBLY FOR A DISC BRAKE

(71) Applicant: Meritor Heavy Vehicle Braking Systems (UK) Limited, Cwmbran Gwent (GB)

(72) Inventor: Dietmar Knoop, Cwmbran Gwent (GB)

(73) Assignee: Meritor Heavy Vehicle Braking Systems (UK) Limited, Cwmbran (GB)

( * ) Notice: Subject to any disclaimer, the term of this patent is extended or adjusted under 35 U.S.C. 154(b) by 0 days.

(21) Appl. No.: 16/986,352

(22) Filed: Aug. 6, 2020

(65) Prior Publication Data

US 2021/0048078 A1    Feb. 18, 2021

(30) Foreign Application Priority Data

Aug. 16, 2019 (EP) .................................... 19192147

(51) Int. Cl.
| | |
|---|---|
| *F16D 55/2265* | (2006.01) |
| *F16D 65/00* | (2006.01) |
| *B60T 1/06* | (2006.01) |
| *F16D 55/00* | (2006.01) |

(52) U.S. Cl.
CPC ... *F16D 65/0087* (2013.01); *F16D 55/22655* (2013.01); *B60T 1/065* (2013.01); *F16D 2055/007* (2013.01); *F16D 2250/0061* (2013.01); *F16D 2250/0076* (2013.01)

(58) Field of Classification Search
CPC ........... F16D 65/0087; F16D 55/22655; F16D 2055/007; F16D 2250/0061; F16D 2250/0076; B60T 1/065
See application file for complete search history.

(56) References Cited

U.S. PATENT DOCUMENTS

| | | | | |
|---|---|---|---|---|
| 4,111,285 A | * | 9/1978 | Honick | F16D 55/22655 188/73.34 |
| 4,144,952 A | * | 3/1979 | Nakayama | F16D 55/22655 384/297 |
| 4,220,223 A | * | 9/1980 | Rinker | F16D 55/22655 188/250 B |
| 4,311,219 A | * | 1/1982 | Watanabe | F16D 55/22655 188/196 P |
| 4,344,511 A | * | 8/1982 | Stoka | F16D 65/0979 188/73.38 |
| 4,351,421 A | * | 9/1982 | Kurata | F16D 55/22655 188/73.45 |

(Continued)

FOREIGN PATENT DOCUMENTS

| | | |
|---|---|---|
| EP | 3051163 A1 | 8/2016 |
| GB | 2093135 A | 8/1982 |

OTHER PUBLICATIONS

Extended European Search Report dated Feb. 13, 2020, for related European Appln. No. 19192147.7; 7 Pages.

*Primary Examiner* — Thomas W Irvin
(74) *Attorney, Agent, or Firm* — Brooks Kushman PC

(57) ABSTRACT

A guide assembly for a disc brake and method of mounting. The guide assembly may have a guide pin that includes a mounting portion and a guiding portion. A retaining bore of a brake carrier may receive the guide pin and retain the mounting portion. The guiding portion may protrude from an inboard-side of the brake carrier and may slidably support a brake caliper.

11 Claims, 13 Drawing Sheets

(56) References Cited

U.S. PATENT DOCUMENTS

| | | | | |
|---|---|---|---|---|
| 4,944,371 | A * | 7/1990 | Giorgetti | F16D 55/227 188/73.31 |
| 4,964,490 | A * | 10/1990 | Watanabe | F16D 55/22655 188/73.44 |
| 5,263,555 | A * | 11/1993 | Imponente | F16D 55/22655 188/73.34 |
| 5,467,848 | A * | 11/1995 | Knez | F16D 55/22655 188/73.31 |
| 5,507,369 | A * | 4/1996 | Ferreira | F16D 55/227 188/219.1 |
| 5,657,837 | A * | 8/1997 | Yamadera | F16D 55/22655 188/73.42 |
| 5,749,445 | A * | 5/1998 | Ruiz Busquets | F16D 55/22655 188/73.44 |
| 7,337,881 | B1 * | 3/2008 | Sherman, II | F16D 55/22655 188/72.4 |
| 8,251,188 | B2 * | 8/2012 | Teper | F16D 55/22655 188/73.44 |
| 9,435,391 | B2 * | 9/2016 | Loew | F16D 65/0087 |
| 9,869,357 | B2 * | 1/2018 | Knoop | F16D 65/567 |
| 10,781,872 | B2 * | 9/2020 | Jedele | F16D 55/227 |
| 2010/0065385 | A1 * | 3/2010 | Teper | F16D 55/22655 188/73.45 |
| 2015/0122599 | A1 * | 5/2015 | Loew | F16D 65/0087 188/73.45 |
| 2016/0215834 | A1 * | 7/2016 | Knoop | F16D 55/226 |
| 2016/0356325 | A1 * | 12/2016 | Knoop | F16D 55/227 |
| 2018/0135709 | A1 * | 5/2018 | Knoop | F16D 65/18 |
| 2021/0048079 | A1 * | 2/2021 | Knoop | F16D 55/2265 |
| 2021/0048080 | A1 * | 2/2021 | Thomas | F16D 55/22655 |

* cited by examiner

GUIDE ASSEMBLY FOR A DISC BRAKE

TECHNICAL FIELD

The present teachings relate to a disc brake. In particular, but not exclusively, the present teachings relates to a guide assembly for a disc brake and a method of mounting a guide pin of the guide assembly for a disc brake.

BACKGROUND

Disc brakes are commonly used for braking heavy vehicles such as trucks, buses and coaches.

Heavy vehicle disc brakes typically comprise a brake carrier, a brake caliper and a brake rotor. The brake carrier is arranged to carry brake pads on each side of the brake rotor. The brake caliper is slidably mounted on the brake carrier by at least one guide assembly, such that when the disc brake is actuated, the brake caliper is able to slide with respect to the brake carrier. As the brake caliper slides inboard, the brake pads are urged onto the opposing faces of the brake rotor in a clamping action and a braking action is affected.

The guide assembly comprises a guide pin. In use, the guide pin is mounted on the brake carrier and located in the sliding bore of the brake caliper so that the brake caliper can slide along the guide pin. Typically, each guide pin comprises a smooth outer guide sleeve along which the brake caliper slides and a guide bolt which extends through the guide sleeve and is screwed into a threaded receiving hole of the brake carrier to retain the guide pin.

This arrangement has been proven over many years of usage. However, the guide pin has multiple parts requiring precision manufacturing. The guide pin requires careful fitting to ensure it is it correctly located. The guide bolt tightening process can cause error. It has also been recognized that in certain testing conditions, specifically when a vehicle undergoes a significant number of forward and reverse movements, there is a risk that the guide bolt of the disc brake may rotate and loosen from the threaded receiving hole of the carrier. The cause of the loosening bolt problem is the rotation and/or translation of the guide sleeve and the rotation and/or translation of the guide sleeve being frictionally transmitted into rotation of the bolt.

The present teachings seek to overcome or at least mitigate the problems of the prior art.

SUMMARY

A first aspect relates to a guide assembly for a disc brake. The guide assembly comprises: a guide pin, the guide pin having a monolithic body comprising a mounting portion and a guiding portion; and a retaining bore of a brake carrier, the retaining bore configured to receive the guide pin and retain the mounting portion whereby the guiding portion protrudes from an inboard-side of the brake carrier and is configured to slidably support a brake caliper.

The monolithic guide pin is a simple one-piece component. By having a guide pin with a monolithic structure, problems associated with manufacturing, cost, fitting, failure, relative movement and loosening of conventional guide pins with multiple component parts are avoided or at least reduced.

The retaining bore may be a through-hole extending through the brake carrier. The retaining bore may be configured to slidably receive the guide pin from the inboard-side of the brake carrier or from the outboard-side of the brake carrier. As a result, the guide pin may be received from either side of the brake carrier.

By retaining the mounting portion in the retaining bore, the guide pin is thereby mounted on the brake carrier.

To retain the mounting portion, the mounting portion and/or the retaining bore may be mechanically deformable and/or thermally deformable to form an interference engagement between the mounting portion and the retaining bore. This allows for the press-fitting and/or shrink-fitting of the guide pin in the brake carrier.

To enhance the securing of the guide pin on the brake carrier, the guide assembly may further comprise a weld formed between the mounting portion and the retaining bore. Additionally or alternatively, the monolithic body may further comprise a flange and/or a peened region configured to abut an outboard-side of the brake carrier.

The mounting portion may have a generally circular cross-sectional profile or a polygonal cross-sectional profile. For example, the mounting portion may have a regular or non-regular polygonal profile. The polygonal mounting portion may have a triangular, rectangular square, or octagonal cross-sectional profile.

The body of the guide pin may have a constant cross-sectional profile substantially along its length. As such, the mounting portion and guiding portion have the same cross-sectional profile.

The retaining bore may have a generally circular cross-sectional profile or a generally polygonal cross-sectional profile.

The retaining bore and the mounting portion may have corresponding cross-sectional profiles or different cross-sectional profiles.

A second aspect relates to a disc brake comprising: a brake carrier; a brake caliper; and a guide assembly according to the first aspect of the present teachings.

A third aspect relates to a method of mounting a guide pin on a brake carrier, the method comprising: providing a guide pin with a monolithic body comprising a mounting portion and a guiding portion; providing a retaining bore extending through a brake carrier; and disposing the guide pin in the retaining bore and forming a retaining engagement between the mounting portion and the retaining bore, whereby the guiding portion protrudes from an inboard-side of the brake carrier.

In the method, the disposing may comprise: sliding the mounting portion into the retaining bore from the inboard-side of the brake carrier; or sliding the guide pin body into the retaining bore from the outboard-side of the brake carrier, the guiding portion sliding through the retaining bore and beyond the inboard-side of the brake carrier.

In the method, the forming a retaining engagement may comprise mechanically and/or thermally deforming the mounting portion and/or the retaining bore to form an interference engagement.

The method may further comprise providing a weld between the mounting portion and the bore.

The method may further comprise providing a flange of the guide pin; and abutting the flange against the outboard-side of the brake carrier when the guide pin is disposed in the retaining bore.

A method may further comprise peening a region of the mounting portion against the outboard-side of the brake carrier when the guide pin is disposed in the bore.

BRIEF DESCRIPTION OF THE DRAWINGS

For a better understanding of the teachings and to show how they may be carried into effect, reference will now be made by way of example only, to the accompanying drawings, in which.

DETAILED DESCRIPTION

As required, detailed embodiments of the present invention are disclosed herein; however, it is to be understood that the disclosed embodiments are merely exemplary of the invention that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present invention.

With reference to FIGS. 1 to 13, a disc brake of the present teachings is indicated generally at 1.

Various orientations of the disc brake are described. In particular the directions inboard I and outboard O refer to the typical orientation of the disc brake when fitted to a vehicle and with reference to the longitudinal center line of the vehicle. The radial direction R refers to an orientation with reference to the center of the rotor (axis A-A) and is for example the direction in which brake pads may be fitted and removed from a disc brake. The circumferential direction C refers to a tangent to the direction of the rotation of the rotor and is for example the direction in which a friction induced load from a brake pad is laterally transmitted into an abutment of a brake carrier.

Figure 1:
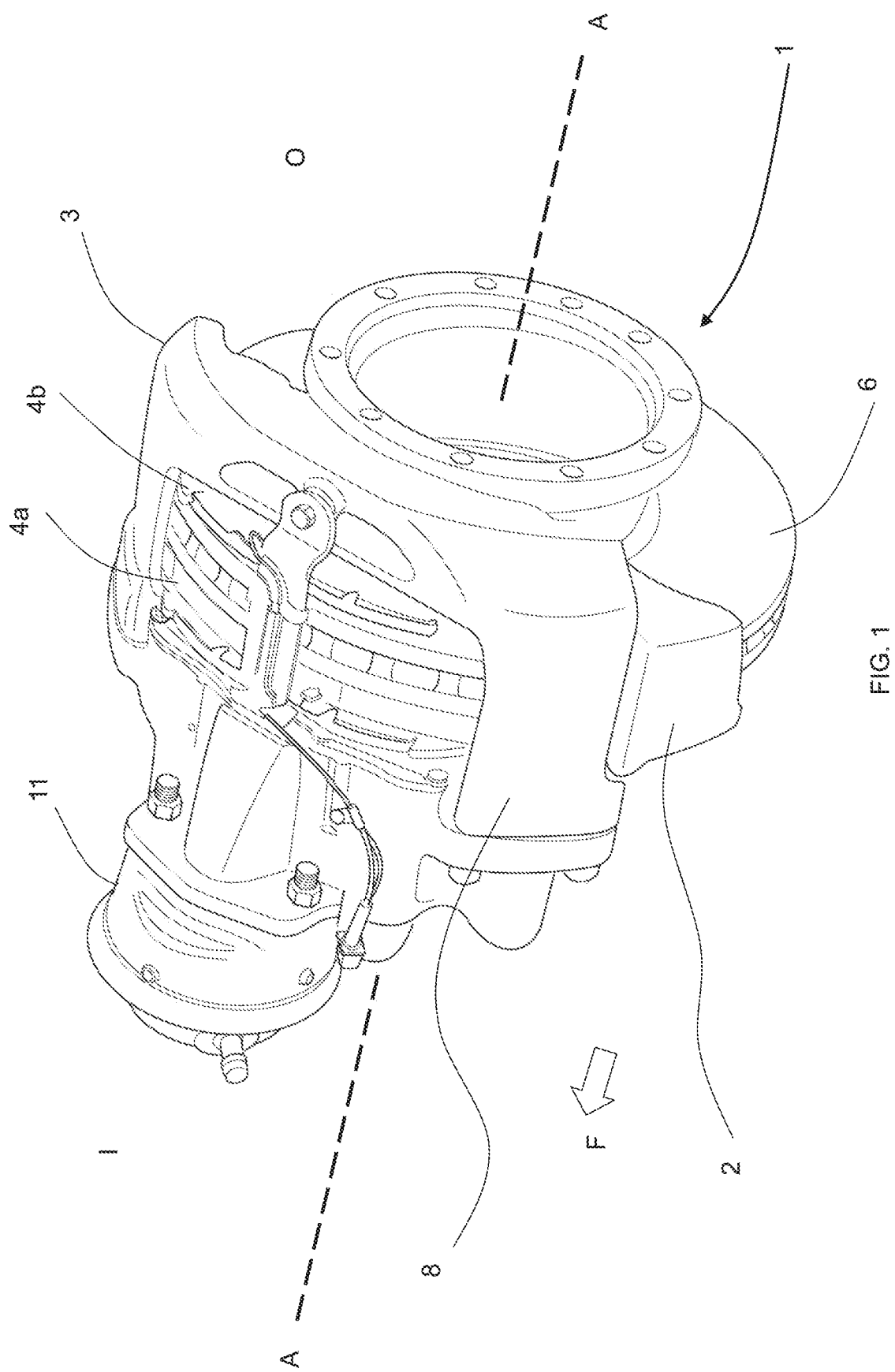
FIG. 1 is an isometric view of an embodiment of a disc brake according to the present teachings.

With reference to FIG. 1, the disc brake 1 comprises a brake carrier 2. The brake carrier 2 carries an inboard brake pad 4a and an outboard brake pad 4b. A brake rotor 6 is positioned between the brake pads and is rotatable about axis A-A. A brake caliper 8 is slidably mounted on the brake carrier 2 by at least one guide assembly.

Figure 2:
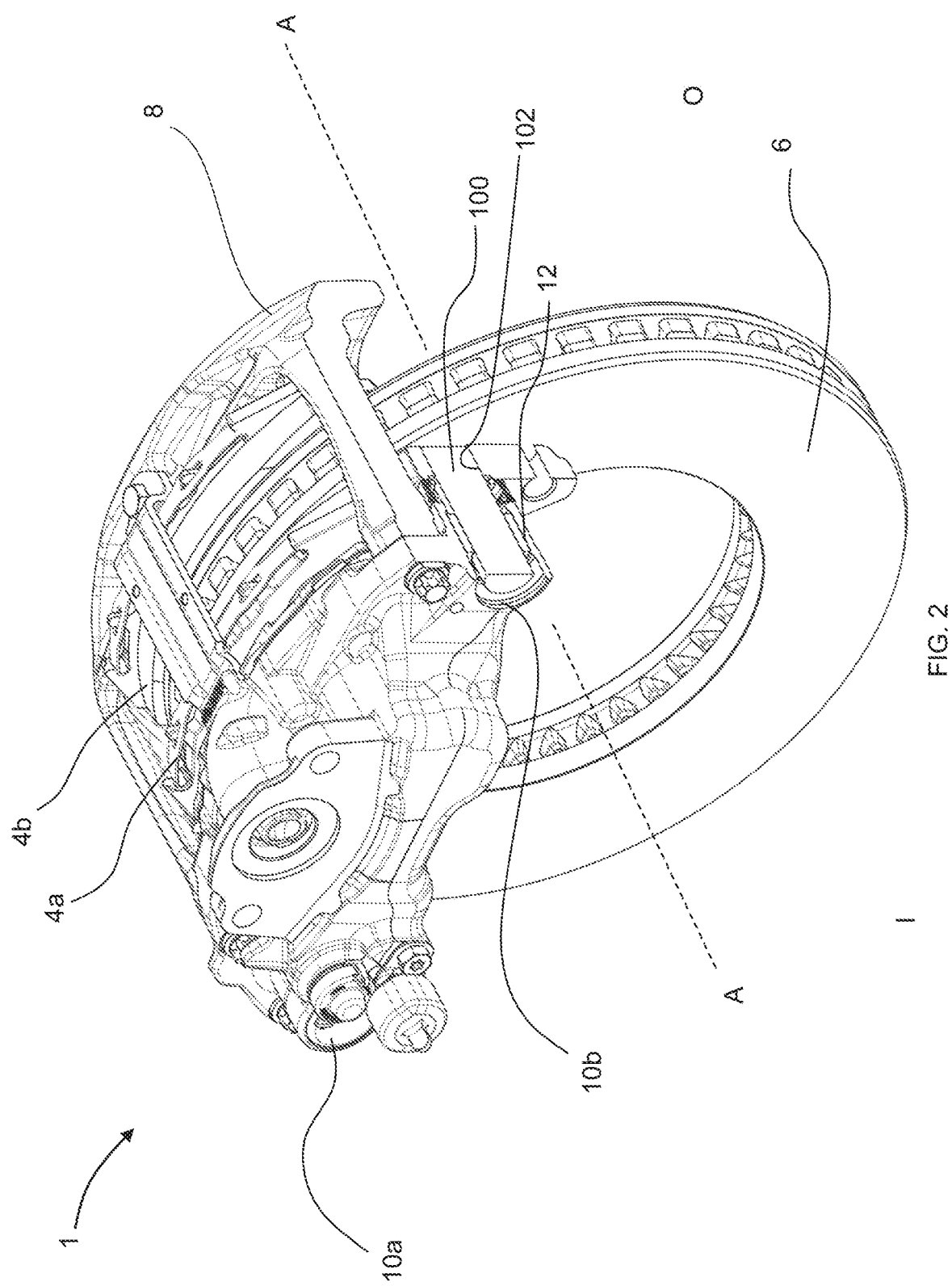
FIG. 2 is an isometric view of the disc brake of FIG. 1, with a brake rotor in situ, air actuator omitted and a cross-sectional view of a first embodiment of a guide assembly.

The disc brake 1 comprises at least one guide assembly. In the embodiment depicted the disc brake comprises two guide assemblies 10a, 10b (FIG. 2). The guide assemblies slidably support the brake caliper 8 and allow the brake caliper to slide in an inboard-outboard direction relative to the brake carrier 2, parallel to the axis A-A.

Each guide assembly 10a, 10b comprises a guide pin 100 and a retaining bore 102 formed in the brake carrier 2. The guide pin 100 is mounted on the brake carrier in the retaining bore 102 and extends from the inboard-side of the brake carrier into a respective sliding bore 12 of the brake caliper 8.

One of the guide assemblies 10b may be shorter than the other guide assembly 10a in order to accommodate vehicle installation constraints and/or because one acts the primary guide on the leading edge in normal direction of rotation and the other acts as a secondary guide. In an alternative embodiment the guide pins may be of equal length.

The disc brake further comprises an actuator 11 for moving the inboard brake pad 4a into frictional contact with the brake rotor 6 when the disc brake is actuated (via a suitable mechanism (not shown) located within the caliper 8). When the inboard brake pad 4a is pushed by the actuator 11 into contact with the brake rotor 6, a reaction force F drives the brake caliper 8 to slide inboard relative to the brake carrier. As the brake caliper 8 slides inboard, it moves the outboard brake pad 4b towards the brake rotor 6. Hence, the brake rotor 6 becomes clamped between the inboard and outboard brake pads 4a, 4b and the rotation of the brake rotor is frictionally inhibited.

In the guide assembly according to the present teachings, the guide pin 100 has a monolithic body comprising a mounting portion 104 and a guiding portion 106.

By having a one-piece (monolithic) body structure, the guide pin 100 has a simple design that is easy and low cost to manufacture. Also, the problems associated with guide pins having multiple components and the relative movement and loosening of guide pins with multiple components are mitigated.

Figure 3:
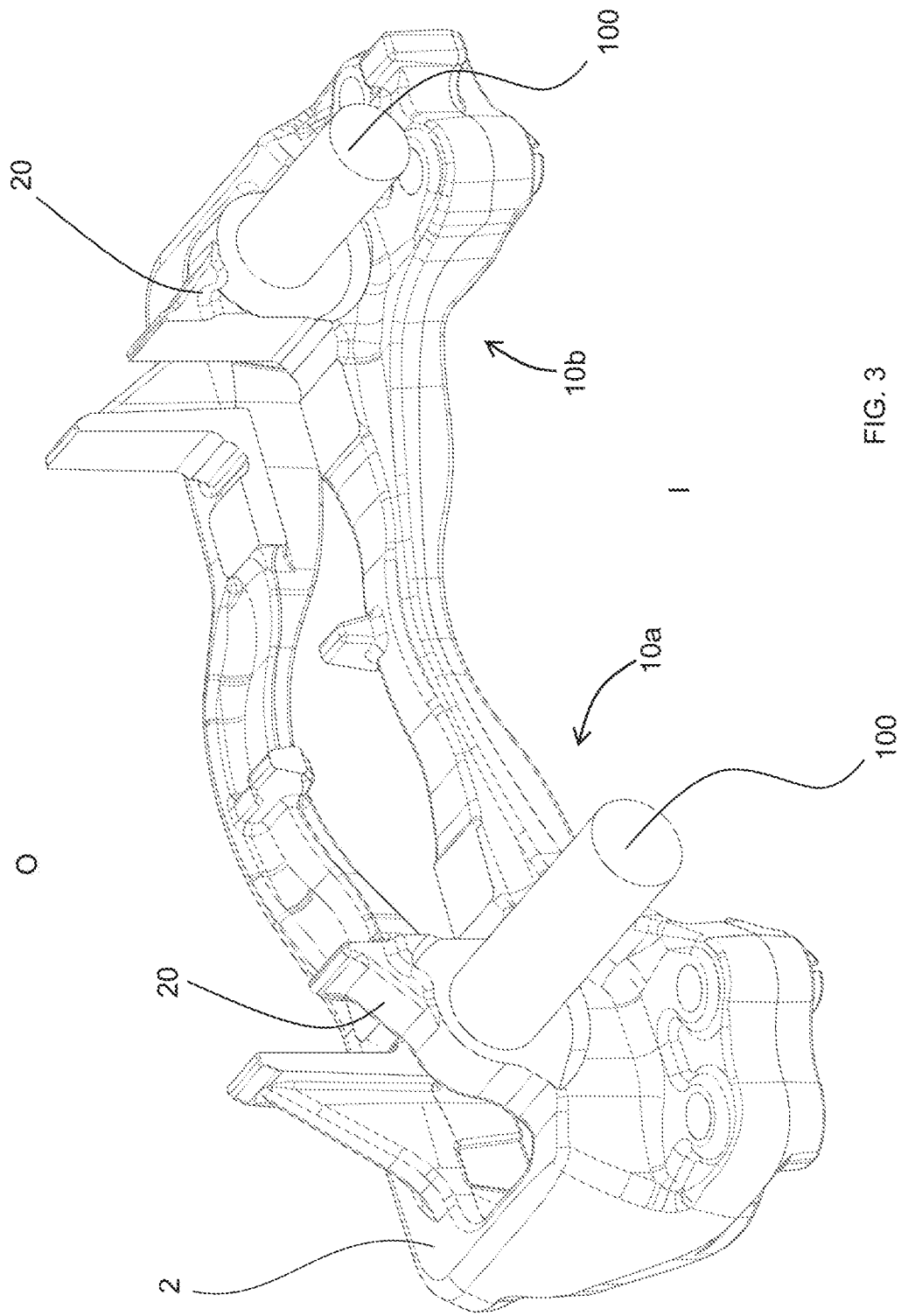
FIG. 3 is an isometric view of a tangential mount brake carrier, with guide pins mounted in situ on the brake carrier in accordance with a second embodiment of a guide assembly.
Figure 4:
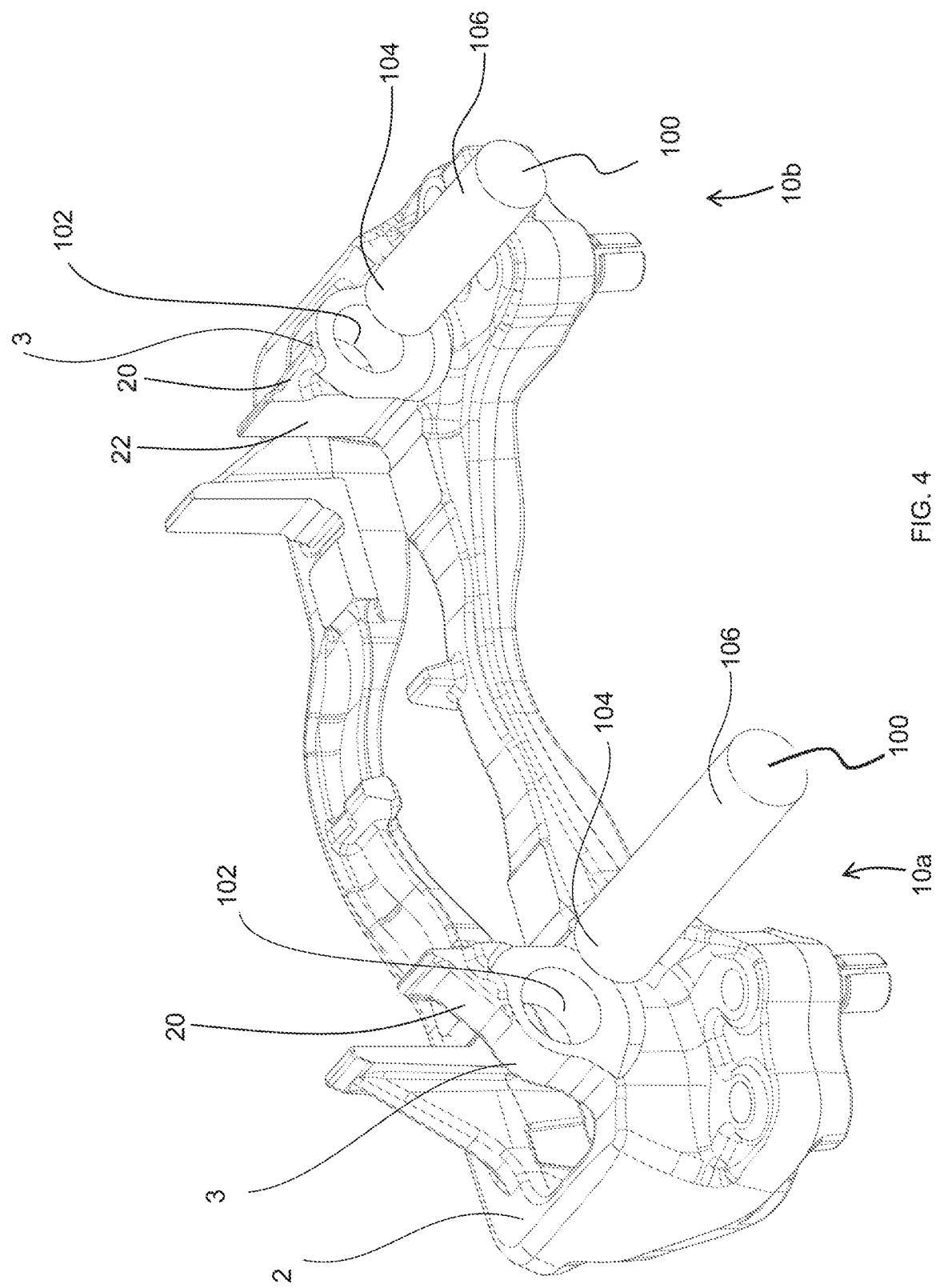
FIG. 4 is an exploded view of the carrier of FIG. 3 showing the retaining bores of the guide assemblies.
Figure 5B:
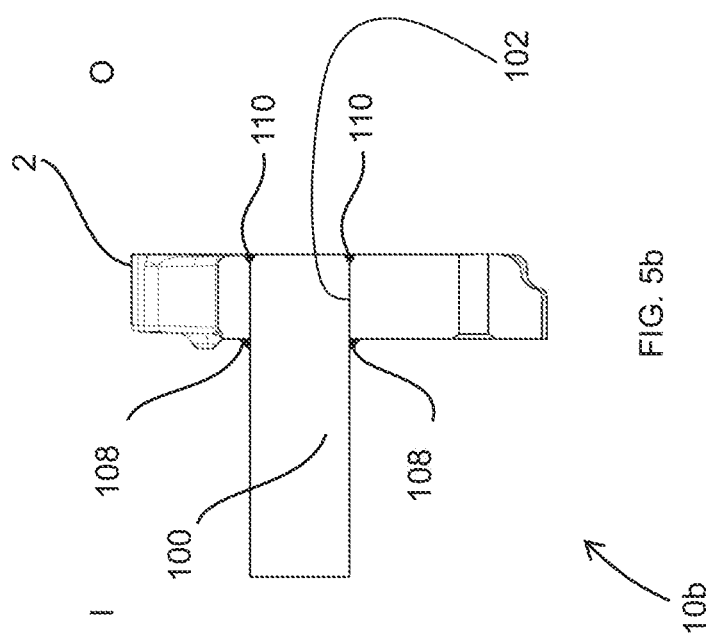
FIG. 5b is a cross-sectional view of FIG. 5a, on the plane B-B.
Figure 5A:
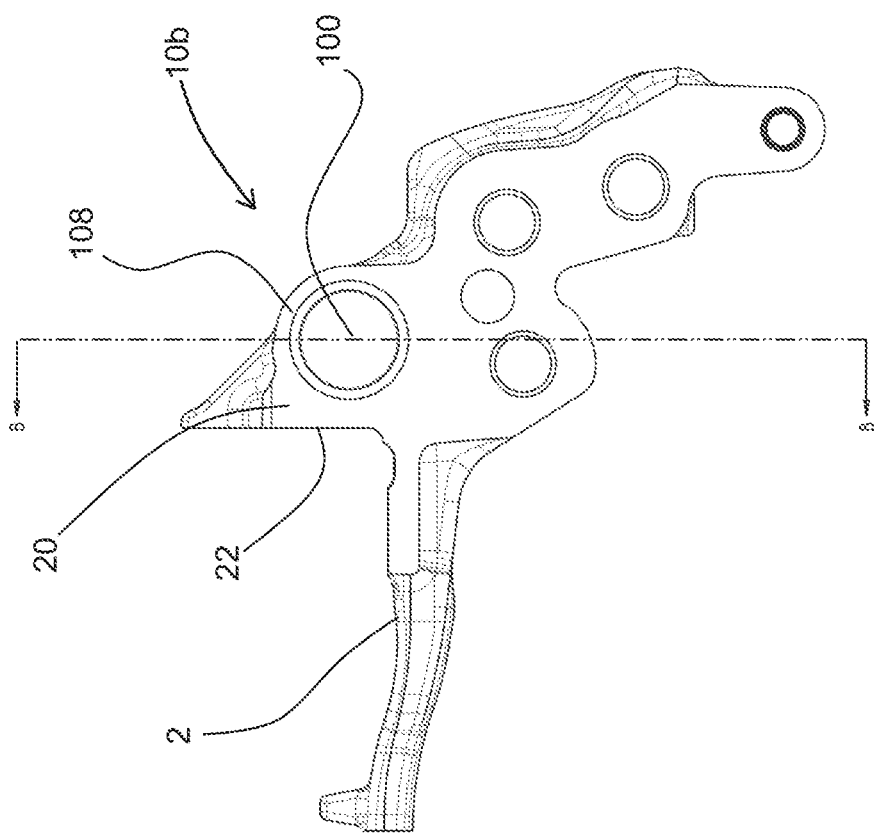
FIG. 5a is a front view showing a guide assembly of a third embodiment where the guide pin is mounted in the brake carrier and further secured by a weld.

With reference to FIGS. 2, 3 and 4, the mounting portion 104 of the guide pin 100 is configured to be received and engagingly retained within the retaining bore 102, of the brake carrier 2 so as to mount the guide pin on the brake carrier. The guiding portion 106 is configured to extend from the inboard-side of the brake carrier into a sliding bore 12 of the brake caliper 8 and form a sliding contact so that the brake caliper can slide over the guide pin 100 relative to the brake carrier 2. The guiding portion 106 thereby slidably supports the brake caliper 8 and is able to guide the sliding of the brake caliper relative to the brake carrier 2 when the disc brake is actuated.

The mounting portion 104 of the guide pin 100 may be arranged at a first end and/or a first end region of the monolithic body. The remainder of the monolithic body may form the guiding portion 106 of the guide pin.

The monolithic body of the guide pin 100 may be substantially solid or hollow. For example, the monolithic body may comprise a solid cylinder bar having a circular cross-sectional profile, a hollow tube having a first opening at the first end and a second opening at the second end, or a capped tube closed at the first end and open at the second end.

The cross-sectional profile of the guide pin 100 may be substantially constant along the length of the monolithic body. For example, the monolithic body may have an elongate body with a generally circular cross-sectional profile or a polygonal cross-sectional profile (regular or non-regular). As such, the mounting portion 104 and the guiding portion 106 may have the same cross-sectional profile. Alternatively, the mounting portion may have a different cross-sectional profile to the guiding portion. Additionally, there may be provided an annular recess feature (not shown) at the junction or intersection of the mounting portion 104 and guiding portion 106 in order to mount a flexible sealing boot (not shown) to the guide pin 100.

The monolithic body of the guide pin 100 may be formed from steel. For example, stainless steel or carbon steel.

The retaining bore 102 is configured to receive the guide pin 100 and form an engagement with the mounting portion 104 such that the mounting portion is retained in the retaining bore 102 and the guiding portion 106 protrudes from the inboard side of the brake carrier 2 in an inboard direction. In the guide assembly of the present teachings, the retaining bore 102 may be a through-hole that extends through the brake carrier 2. In this embodiment retaining bore is located in a portion of the carrier 2 that defines a circumferential abutment 20 on which a circumferential abutment surface 22 is forced to restrain circumferential movement of the inboard brake pad 4a. The retaining bore 102 may be configured to receive the guide pin 100 from the inboard side of the brake carrier 2, whereby the mounting portion 104 slides directly into the retaining bore and engages. The brake carrier 2 and retaining bore 102 may be configured to allow the guide pin to be received from the outboard side of the brake carrier 2, whereby the guiding portion slides through the retaining bore and beyond the inboard side of the brake carrier prior to the mounting portion 104 sliding into and engaging with the retaining bore.

The guide pin 100 is mounted to a portion of the carrier 2 that extends radially outwardly to form an abutment 3. This is a strong part of the carrier with sufficient space to form such a mounting. The abutment takes the (circumferentially directed) braking load from the inboard brake pad 4a under braking and transmits it to the carrier.

The mounting portion 104 and retaining bore 102 may be mechanically and/or thermally deformable to optimize retention and form an interference engagement between mating contact surfaces of the mounting portion and bore. By forming the interference engagement, movement of the guide pin within the retaining bore is restricted, and any undesirable rotation and rattling etc. is limited. For example, the retaining bore 102 may be mechanically deformable to allow for the mounting portion to be press-fitted and retained in the retaining bore. The mounting portion 104 may be thermally deformable to be shrink-fitted into the retaining bore. The mounting portion 104 may be thermally shrunk by cooling the guide pin with a cryogenic material, such as liquid nitrogen or similar.

The brake carrier 2 may be formed from iron, for example, cast iron or ductile iron.

The retaining bore 102 may have a generally circular cross-sectional profile or polygonal profile. The retaining bore 102 may have a corresponding or different cross-sectional profile to the mounting portion 104.

In the guide assembly embodiment 5 depicted in FIGS. 1 to 4, the guide pin 100 comprises a solid monolithic body with a constant circular cross-sectional profile along its length. The guide pin 100 is formed from a cylindrical bar of stainless steel. The mounting portion 104 is arranged at a first end region of the guide pin. The remainder of the guide pin forms the guiding portion 106.

In the embodiments depicted in FIGS. 1 to 4, the retaining bore 102 is formed in the brake carrier 2 and has a circular cross-sectional profile corresponding to the guide pin. In this embodiment, the retaining bore 102 is sufficiently deformable and has a configuration with respect to the mounting portion so as to form an interference engagement as the mounting portion is press-fitted into the retaining bore from the inboard-side of the brake carrier. In other words, the mounting portion 104 has a slightly larger diameter than the retaining bore 102 in order to facilitate press fitting and subsequent engagement of the pin 100. As such the mounting portion 104 is retained within the retaining bore 102 and the guiding portion 106 protrudes from the inboard-side of the brake carrier 2 to slidably support the caliper 8.

The retention of the guide pin 100 in the brake carrier 2 may be aided by providing a weld between the mounting portion and the retaining bore. In the third embodiment depicted in FIGS. 5a and 5b, the guide assembly having the features previously shown in FIGS. 1 to 4 further comprises welds 108, 110 to further secure the guide pin 100 to the brake carrier 2. In this embodiment, the guide assembly 10b comprises a first weld 108 provided on the inboard-side I of the brake carrier 2 and a second weld 110 provided on the outboard-side O of the brake carrier. The welds 108, 110 may have any suitable configuration to provide additional retention.

In the particular embodiment depicted, the welds 108, 110 are generally circular, substantially encircling the mounting portion so as to form a collar at the intersection between the mounting portion 104 and retaining bore 102. In an alternative embodiment, there is may be only a single weld, or more than two welds. The weld may be any type of suitable weld and formed by any suitable welding technique. In some embodiments welding may be used as an alternative to an interference fit.

Other means for improving the retention of the guide pin in the brake carrier may include a flange and/or a peened region.

Figure 6:
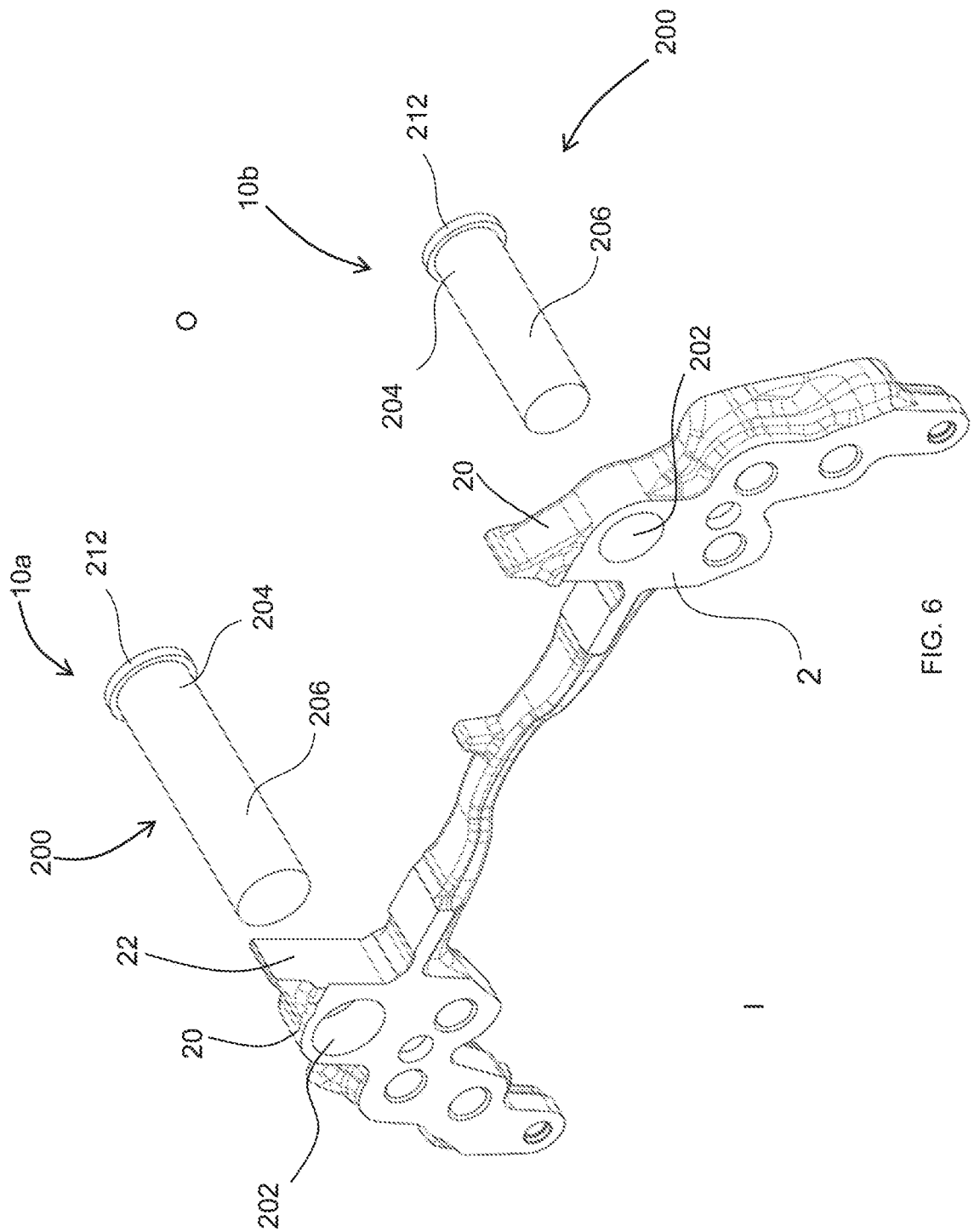
FIG. 6 is an exploded view showing a further brake carrier and two guide assemblies of a fourth embodiment where the guide pin has a flange.
Figure 7:
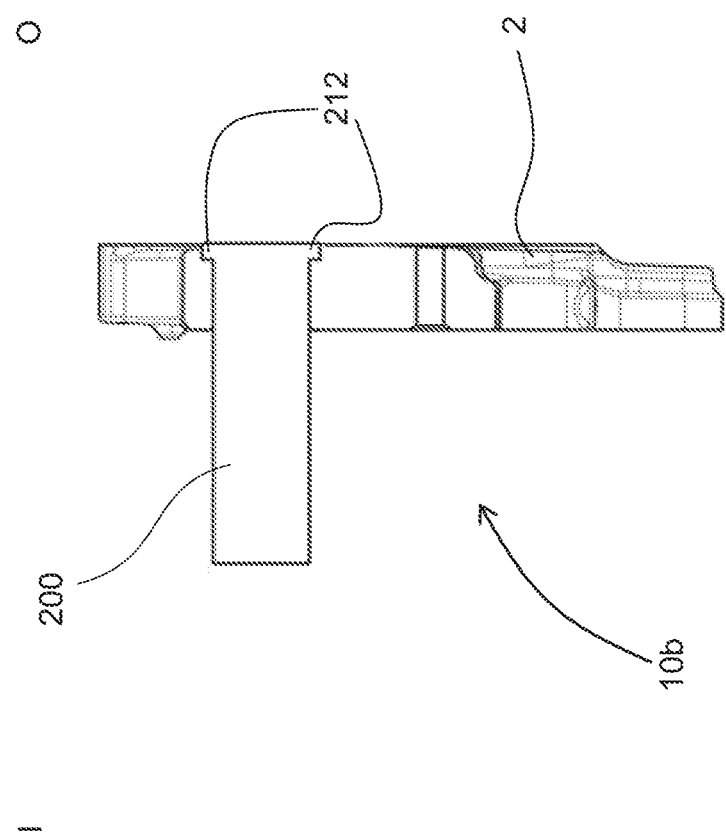
FIG. 7 is a cross-sectional view of the carrier of FIG. 7 when assembled on the same plane as FIG. 5b.

In the embodiment depicted in FIGS. 6 and 7 reference numerals for similar features depicted in the preceding embodiments are labelled 100 higher. The further embodiments described below are each successively labelled 100 greater. The guide assembly having the features previously shown in FIGS. 1 to 4 further comprises a flange. In this embodiment, the flange is a circumferential flange 212 protruding radially from the mounting portion 204 of the guide pin 200. The circumferential flange 212 abuts the outboard-side surface of the abutment 3 of the brake carrier 2 when the guide pin 200 is received by the retaining bore 202. The abutting action of the flange 212 helps to further secure the guide pin 200 to the brake carrier 2. The flange 212 may be used in conjunction with welding, in which case only an inboard weld 208 may be required and/or an interference fit.

In this embodiment, the guide pin 200 is slidably received in retaining bore from the outboard-side of the brake carrier, guiding portion first. This is facilitated by the carrier 2 being of the type that only supports the inboard brake pad 4a with the outboard broke pad being supported on the caliper 8 only. As such there are no outboard pad abutments to block the fitting of the guide pins 200. In other embodiments, there may be outboard pad abutments which are circumferentially offset from the inboard abutments 20 to allow fitting.

Figure 8:
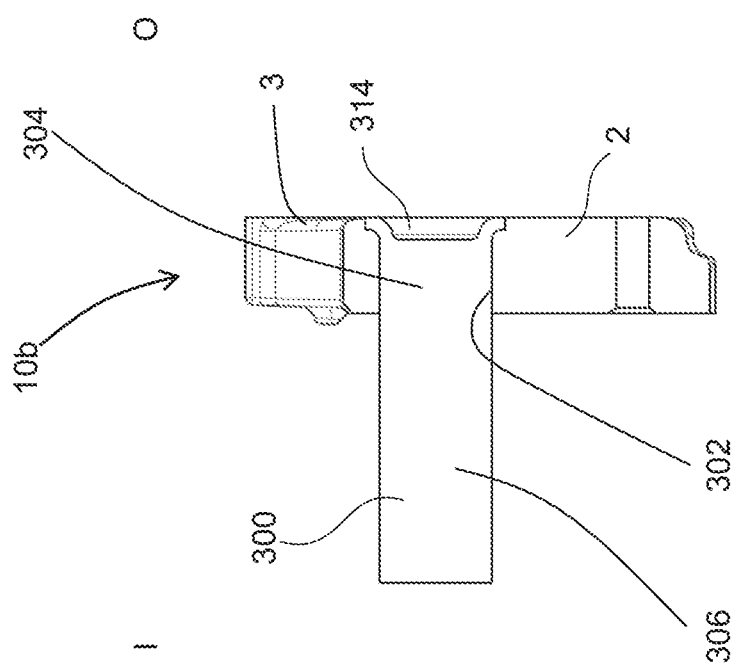
FIG. 8 is a cross-sectional view of a carrier of a fifth embodiment, but on the same place as FIG. 5b.

In FIG. 8, the guide assembly having the features previously shown in FIGS. 1 to 4 further comprises a peened region. In this embodiment, the mounting portion 304 of the guide pin 300 comprises a deformed peened region 314 that is shaped to extend across the outboard-side surface of the brake carrier 2 and aid the gripping of the guide pin to the brake carrier. The peened region of the mounting portion may be formed by any suitable peening technique after the guide pin 300 has been received in the bore 302. The peening may be used in conjunction with welding, in which case only an inboard weld 308 may be required and/or an interference fit.

Figure 9:
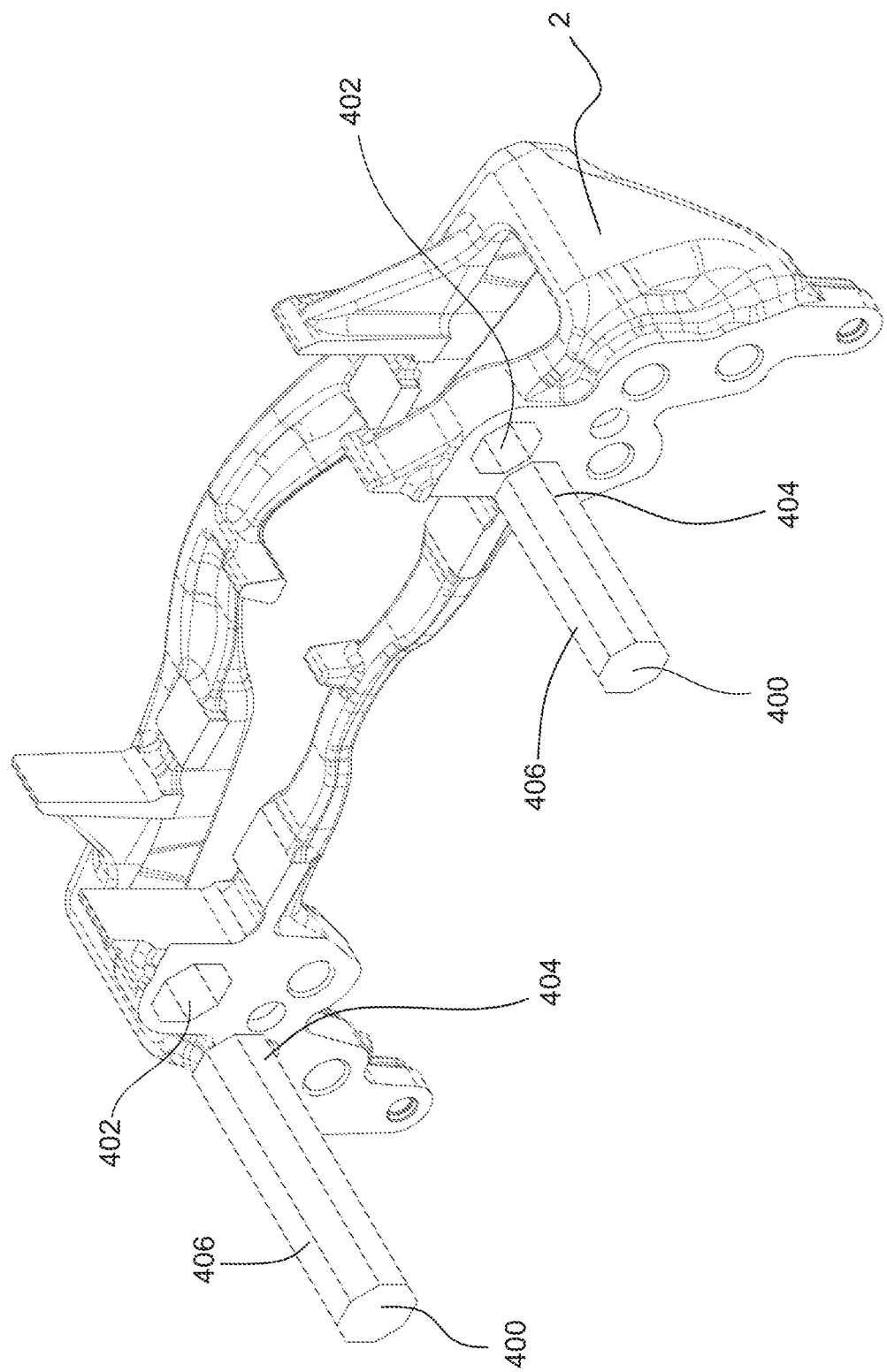
FIG. 9 is an exploded isometric view showing a brake carrier and two guide assemblies according to a sixth embodiment where the guide pin and bore have corresponding octagonal profiles.

FIG. 9 depicts a further embodiment of the guide assembly 10a, 10b where the guide pin 400 has a solid monolithic body with a constant polygonal cross-sectional profile along the length of the monolithic body. The retaining bore 402 formed in the brake carrier 2 has a corresponding polygonal cross-sectional profile to receive the polygonal mounting portion 404 of the guide pin 400. In this embodiment, the guide pin 400 and the retaining bore 402 have a corresponding octagonal cross-sectional profile. The mounting portion 404 and retaining bore 402 thereby have eight corresponding faces that form a face mating contact as they engage. In alternative embodiments (not shown), the guide pin and the retaining bore may have other corresponding polygonal profiles. For example, the guide pin and retaining bore may have a corresponding triangle, square, rectangular, trapezoidal, pentagonal or hexagonal profile.

The corresponding polygonal profiles of the guide pin 400 and retaining bore 402 may advantageously improve the mating contact area between the mounting portion of the guide pin and the retaining bore so as to enhance the interference engagement and retention of the guide pin in the brake carrier 2. The corresponding polygonal profiles of the guide pin 400 and retaining bore 402 also help to inhibit rotation of the mounting portion within the retaining bore of the brake carrier caused by torque acting on the guide pin during use. The movement and risk of loosening the guide pin is thereby reduced.

Figure 10:
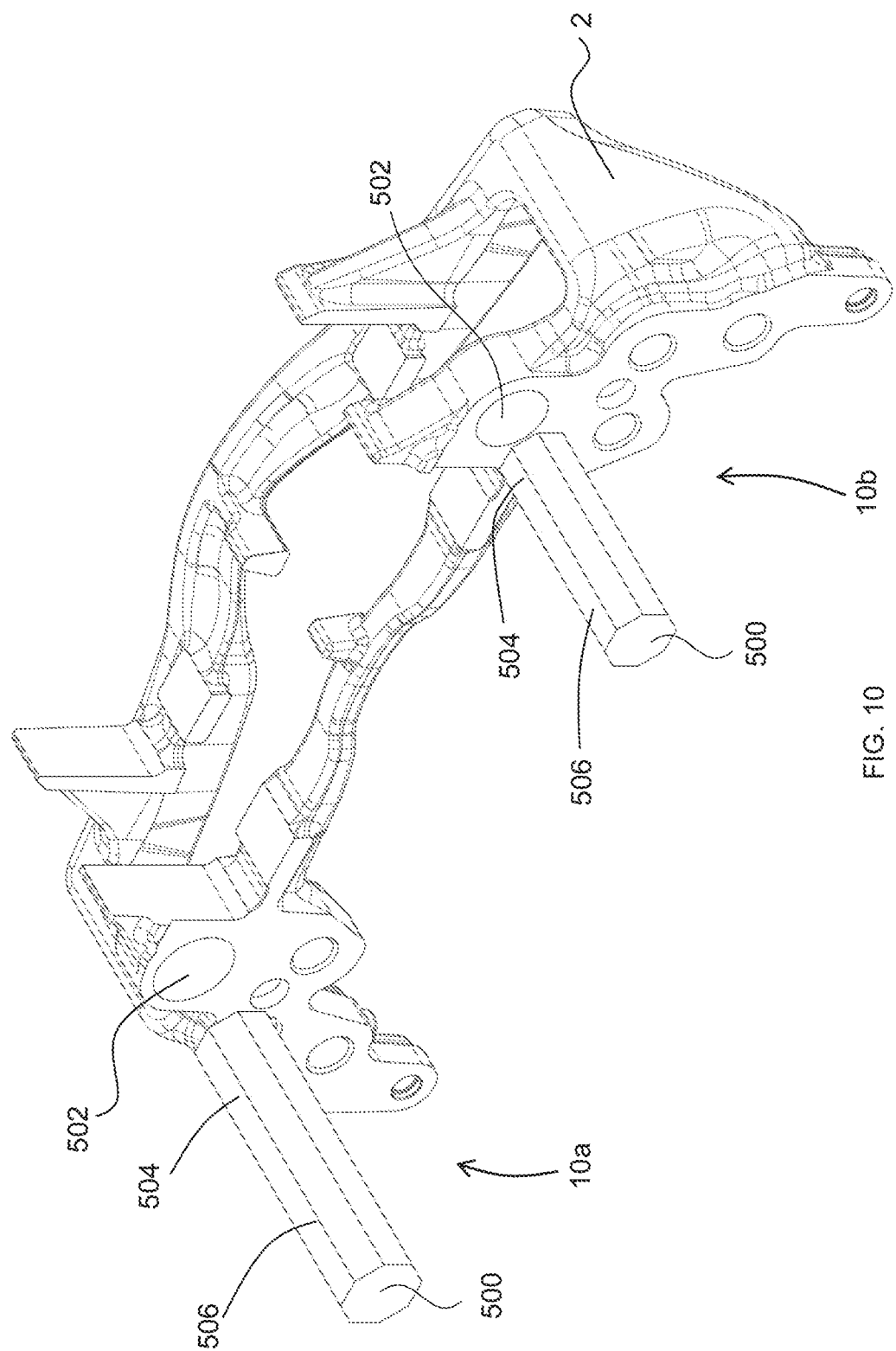
FIGS. 10 to 12 are exploded views showing a brake carrier and two guide assemblies according to seventh, eighth and ninth embodiments where the guide pin and bore have different profiles.
Figure 11:
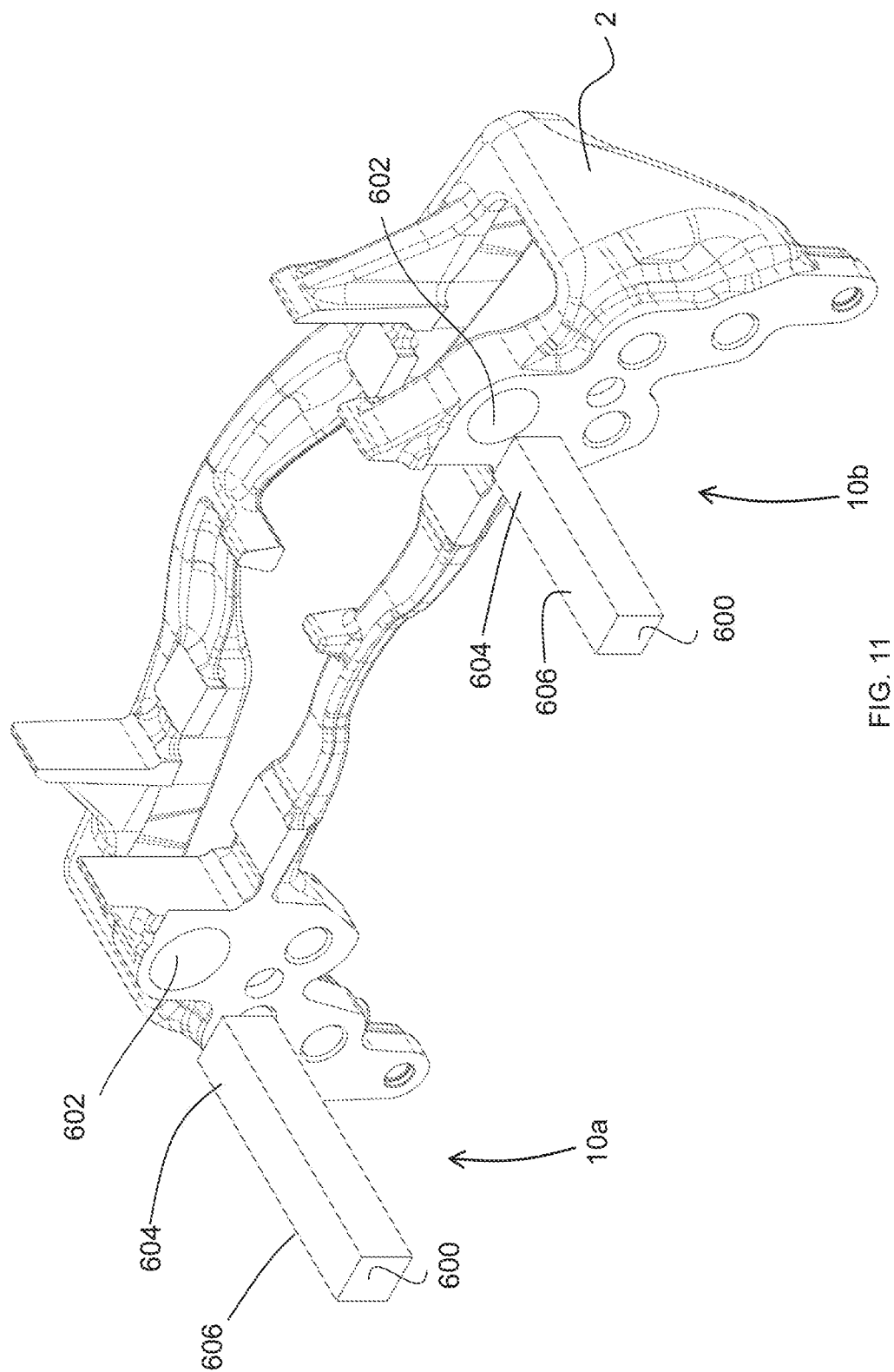
Figure 12:
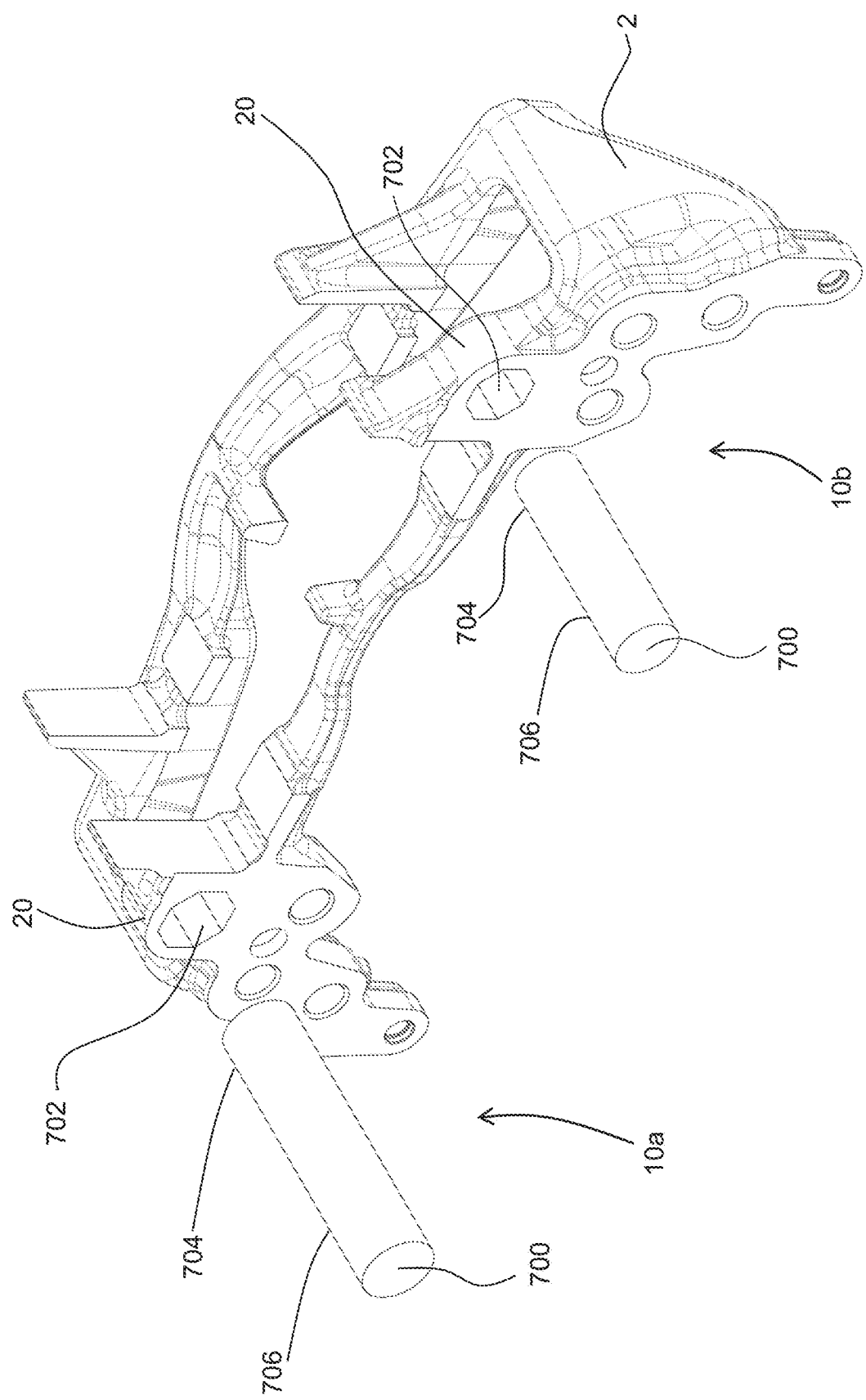

FIGS. 10 to 12 depict different embodiments of guide assemblies 10a, 10b where the guide pin and bore have different, contrasting cross-sectional profiles to one another. In FIG. 10 the guide assemblies 10a, 10b comprise an octagonal guide pin 500 and a circular retaining bore 502. In FIG. 11, the guide assemblies 10a, 10b comprises a rectangular guide pin 600 and a circular retaining bore 602. In FIG. 12, the guide assemblies comprises a circular guide pin 700 and an octagonal retaining bore 702. Any combination of contrasting profiles may be selected to achieve a suitable receiving and retaining effect. For example, the guide pin and bore profiles may be circular, triangular, square, rectangular, trapezoidal, pentagonal or hexagonal.

The contrasting cross-sectional profiles of the mounting portion and retaining bore may enhance the interference engagement and retention of the guide pin in the brake carrier. The contrasting profiles also help to inhibit rotation of the mounting portion within the retraining bore of the brake carrier. Voids created by the interfacing of the contrasting profiles may be filled with a suitable material, e.g., polymeric material, in order to reduce the risk of corrosion and the like.

The mounting portion and/or retaining bore may be mechanically deformable, and/or thermally deformable, as described above, to further improve the interference engagement between the guide pin and brake carrier.

Figure 13:
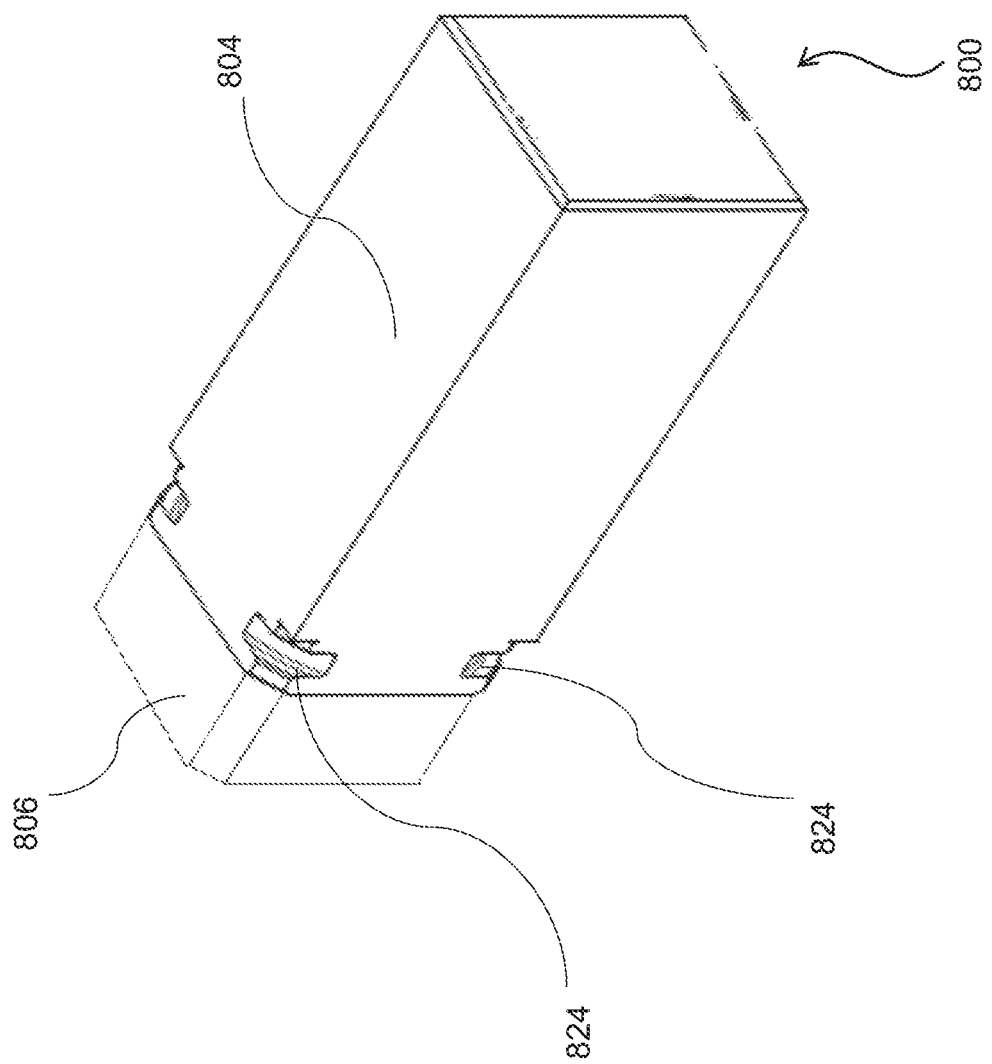
FIG. 13 shows a guide assembly according to a tenth embodiment.

With reference to FIG. 13 a further guide pin 800 is shown which is monolithic but does not have a constant cross-section. Specifically, the mounting portion 804 has a square cross-section with chamfered corners and the guiding portion 806 has a purely square cross-section. At the intersection between the mounting portion 804 and guiding portion 806 recesses 824 are formed to receive and mount a flexible sealing boot (not shown) to protect an exposed part of the guide pin from foreign matter that may cause corrosion of the pin and/or jamming of the sliding movement of the caliper 8.

Although the teachings have been described above with reference to one or more embodiments, it will be appreciated that further embodiments may comprise any combination of features, and various changes or modifications may be made without departing form the scope of the teachings.

While exemplary embodiments are described above, it is not intended that these embodiments describe all possible forms of the invention. Rather, the words used in the specification are words of description rather than limitation, and it is understood that various changes may be made without departing from the spirit and scope of the invention. Additionally, the features of various implementing embodiments may be combined to form further embodiments of the invention.

What is claimed is:

1. A guide assembly for a disc brake comprising:
a guide pin having a monolithic body that includes a mounting portion and a guiding portion; and
a retaining bore of a brake carrier, wherein the retaining bore is configured to receive the guide pin and retain the mounting portion, wherein the guiding portion protrudes from an inboard-side of the brake carrier and is configured to slidably support a brake caliper, wherein the retaining bore is a through-hole extending through the brake carrier, and the retaining bore is configured to slidably receive the guide pin from the inboard-side of the brake carrier and from an outboard-side of the brake carrier that is disposed opposite the inboard-side such that the brake caliper is slidable relative to the guiding portion when the guide pin is received from the inboard-side and the outboard-side of the disc brake.

2. The guide assembly of claim 1 wherein the mounting portion and/or the retaining bore is mechanically deformable and/or thermally deformable as an interference engagement is formed between the mounting portion and the retaining bore.

3. The guide assembly of claim 1 wherein the mounting portion has a generally circular cross-sectional profile or a polygonal cross-sectional profile.

4. The guide assembly of claim 1 wherein the retaining bore has a generally circular cross-sectional profile or a generally polygonal cross-sectional profile.

5. The guide assembly of claim 1 where the retaining bore and the mounting portion having corresponding cross-sectional profiles or different cross-sectional profiles.

6. A disc brake comprising:
a brake carrier having a retaining bore and an inboard-side;
a brake caliper; and
a guide assembly that includes a guide pin having a monolithic body that includes a mounting portion and a guiding portion, wherein the retaining bore receives the guide pin and retains the mounting portion and the guiding portion protrudes from the inboard-side and slidably supports the brake caliper, wherein the retaining bore is a through-hole that extends through the brake carrier, and the retaining bore is configured to slidably receive the guide pin from the inboard-side of the brake carrier and from an outboard-side of the brake carrier that is disposed opposite the inboard-side such that the brake caliper is slidable relative to the guiding portion when the guide pin is received from the inboard-side and the outboard-side of the disc brake.

7. A method of mounting a guide pin of a disc brake comprising:

providing a brake caliper and providing the guide pin with a monolithic body that includes a mounting portion and a guiding portion;

providing a retaining bore extending through a brake carrier, wherein the retaining bore is a through-hole, and wherein the retaining bore is configured to slidably receive the guide pin from an inboard-side of the brake carrier and from an outboard-side of the brake carrier that is disposed opposite the inboard-side such that the brake caliper is slidable relative to the guiding portion when the guide pin is received from the inboard-side and the outboard-side of the disc brake; and disposing the monolithic body into the retaining bore and forming a retaining engagement between the mounting portion and the retaining bore, wherein the guiding portion protrudes from the inboard-side of the brake carrier, wherein disposing the monolithic body comprises:

sliding the mounting portion into the retaining bore from the inboard-side of the brake carrier so that the guiding portion of the guide pin slidably supports the brake caliper, or sliding the monolithic body into the retaining bore from the outboard-side of the brake carrier, the guiding portion sliding through the retaining bore and beyond the inboard-side of the brake carrier so that the guiding portion of the guide pin slidably supports the brake caliper.

8. The method of claim 7 wherein forming the retaining engagement comprises mechanically and/or thermally deforming the mounting portion and/or the retaining bore to form an interference engagement.

9. The method of claim 7 wherein forming the retaining engagement comprises providing a weld between the mounting portion and the retaining bore.

10. A guide assembly for a disc brake comprising:

a guide pin having a monolithic body that includes a mounting portion and a guiding portion;

a retaining bore of a brake carrier, wherein the retaining bore is configured to receive the guide pin and retain the mounting portion, wherein the guiding portion protrudes from an inboard-side of the brake carrier and is configured to slidably support a brake caliper, and a weld between the mounting portion and the retaining bore, wherein the retaining bore is a through-hole extending through the brake carrier, and the retaining bore is configured to slidably receive the guide pin from the inboard-side of the brake carrier and from an outboard-side of the brake carrier that is disposed opposite the inboard-side.

11. A guide assembly for a disc brake comprising:

a guide pin having a monolithic body that includes a mounting portion and a guiding portion, wherein the monolithic body has a constant cross-sectional profile substantially along its length; and a retaining bore of a brake carrier, wherein the retaining bore is configured to receive the guide pin and retain the mounting portion, wherein the guiding portion protrudes from an inboard-side of the brake carrier and is configured to slidably support a brake caliper, wherein the retaining bore is a through-hole extending through the brake carrier; and the retaining bore is configured to slidably receive the guide pin from the inboard-side of the brake carrier and from an outboard-side of the brake carrier that is disposed opposite the inboard-side such that the brake caliper is slidable relative to the guiding portion when the guide pin is received from the inboard-side and the outboard-side of the disc brake.

\* \* \* \* \*